(12) United States Patent
Park et al.

(10) Patent No.: US 11,629,073 B2
(45) Date of Patent: Apr. 18, 2023

(54) HYBRID SYSTEM FOR WATER TREATMENT, DESALINATION, AND CHEMICAL PRODUCTION

(71) Applicant: Kyungpook National University Industry-Academic Cooperation Foundation, Daegu (KR)

(72) Inventors: Hyun Woong Park, Daegu (KR); Seong Hun Kim, Andong-si (KR)

(73) Assignee: KYUNGPOOK NATIONAL UNIVERSITY INDUSTRY-ACADEMIC COOPERATION FOUNDATION, Daegu (KR)

(*) Notice: Subject to any disclaimer, the term of this patent is extended or adjusted under 35 U.S.C. 154(b) by 0 days.

(21) Appl. No.: 16/613,997

(22) PCT Filed: May 11, 2018

(86) PCT No.: PCT/KR2018/005439
§ 371 (c)(1),
(2) Date: Nov. 15, 2019

(87) PCT Pub. No.: WO2018/212513
PCT Pub. Date: Nov. 22, 2018

(65) Prior Publication Data
US 2020/0277207 A1    Sep. 3, 2020

(30) Foreign Application Priority Data
May 16, 2017  (KR) .................. 10-2017-0060432

(51) Int. Cl.
*C02F 1/46*   (2023.01)
*C02F 1/30*   (2023.01)
(Continued)

(52) U.S. Cl.
CPC .............. *C02F 1/4604* (2013.01); *C02F 1/30* (2013.01); *C02F 1/4674* (2013.01);
(Continued)

(58) Field of Classification Search
CPC ..... C25B 1/24; C25B 1/26; C02F 1/30; C02F 1/4674; C02F 2001/46133; C02F 2103/08; C02F 2305/10
See application file for complete search history.

(56) References Cited

U.S. PATENT DOCUMENTS 4,592,807 A * 6/1986 Switzer ................ C25B 11/091
                                                        205/91
2010/0270158 A1* 10/2010 Logan ..................... C02F 3/005
                                                        204/522
(Continued)

FOREIGN PATENT DOCUMENTS

CA    2848861 A1 *  3/2013  ............. H01M 8/16
CN    105879883 A  *  8/2016
(Continued)

OTHER PUBLICATIONS

Korean Office Action dated Jul. 16, 2018 in counterpart Korean Patent Application No. 10-2017-0060432 (6 pages in English and 7 pages in Korean).
(Continued)

*Primary Examiner* — Salil Jain
(74) *Attorney, Agent, or Firm* — NSIP Law

(57) ABSTRACT

The present invention relates to a hybrid system for water treatment, desalination, and chemical production. The hybrid system of the present invention includes a photoanode, an anode chamber, an anion exchange membrane, a middle chamber, a cation exchange membrane, a cathode chamber, and a cathode. In the middle chamber, saltwater or seawater is desalinated by photoelectrochemical electrodi-
(Continued)

alysis. Chloride ions are generated during the desalination, transferred to the anode chamber, and activated by the photoanode. In the anode chamber, wastewater is treated by the activated chloride ions. In the cathode chamber, at least one chemical species selected from the group consisting of water, oxygen, and carbon dioxide is reduced by electrons supplied from the photoanode.

6 Claims, 14 Drawing Sheets

(51) Int. Cl.
| | |
|---|---|
| C02F 1/461 | (2023.01) |
| C02F 1/467 | (2023.01) |
| C02F 1/469 | (2023.01) |
| C02F 101/38 | (2006.01) |
| C02F 103/08 | (2006.01) |

(52) U.S. Cl.
CPC .......... *C02F 1/4676* (2013.01); *C02F 1/4693* (2013.01); *C02F 1/46109* (2013.01); *C02F 2001/46133* (2013.01); *C02F 2101/38* (2013.01); *C02F 2103/08* (2013.01); *C02F 2201/46115* (2013.01); *C02F 2303/10* (2013.01); *C02F 2305/10* (2013.01)

(56) References Cited

U.S. PATENT DOCUMENTS

| | | | |
|---|---|---|---|
| 2018/0230028 A1* | 8/2018 | Li | C02F 1/725 |
| 2018/0251903 A1* | 9/2018 | Xiang | C25B 1/10 |
| 2019/0194041 A1* | 6/2019 | Lefebvre | C02F 1/46104 |
| 2020/0070094 A1* | 3/2020 | Hussaini | B01D 67/0067 |

FOREIGN PATENT DOCUMENTS

| | | |
|---|---|---|
| JP | 2012-505310 A | 3/2012 |
| JP | 2016-29199 A | 3/2016 |
| JP | 2016-102245 A | 6/2016 |
| KR | 10-1295001 B1 | 8/2013 |
| KR | 10-2014-0126076 A | 10/2014 |

OTHER PUBLICATIONS

International Search Report dated Dec. 4, 2018 in counterpart International Patent Application No. PCT/KR2018/005439 (2 pages in English and 2 pages in Korean).

Written Opinion dated Dec. 4, 2018 in counterpart International Patent Application No. PCT/KR2018/005439 (6 pages in Korean).

Decision of Registration issued on Jan. 24, 2019 in counterpart Korean Patent Application No. 10-2017-0060432 (1 pages in English and 4 pages in Korean).

\* cited by examiner

[Fig. 1]
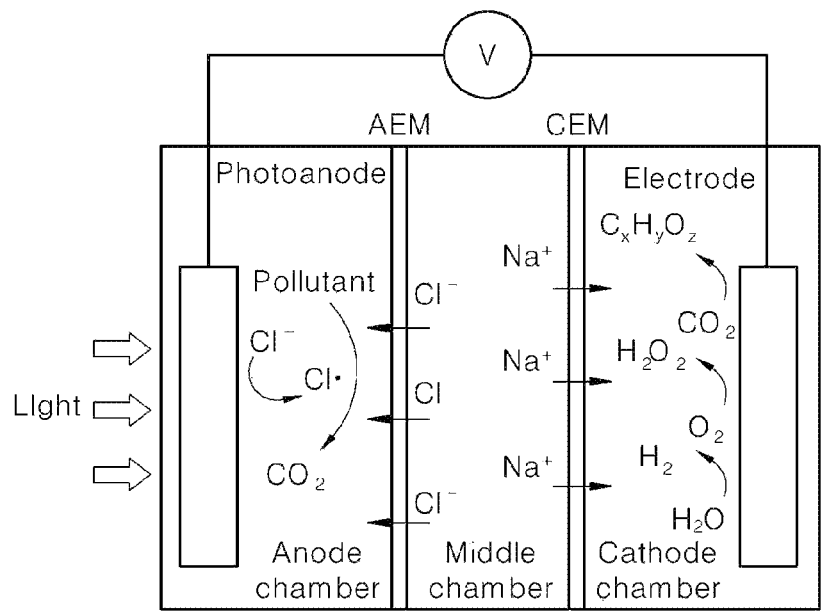

[Fig. 2]
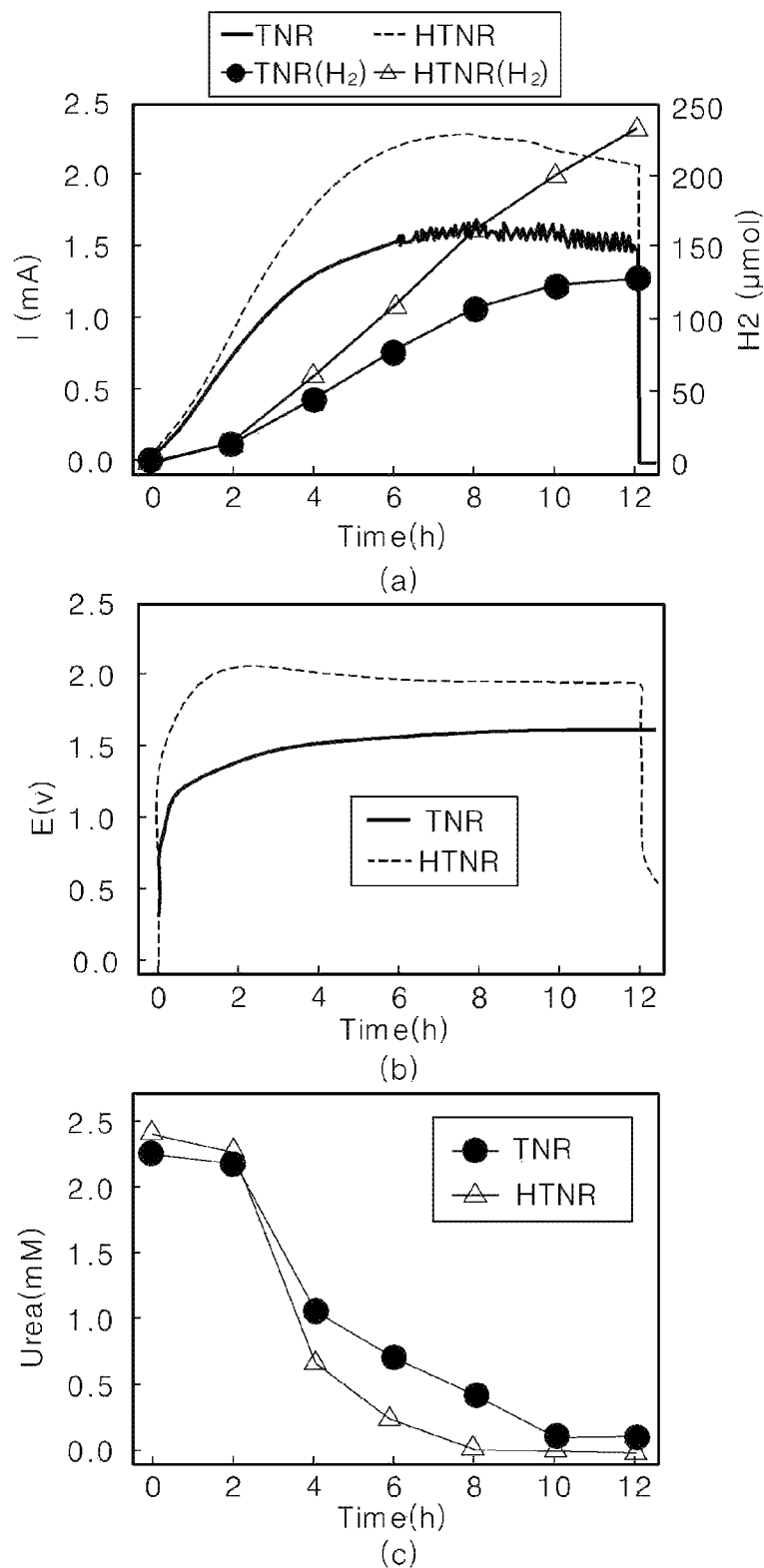

[Fig. 3]
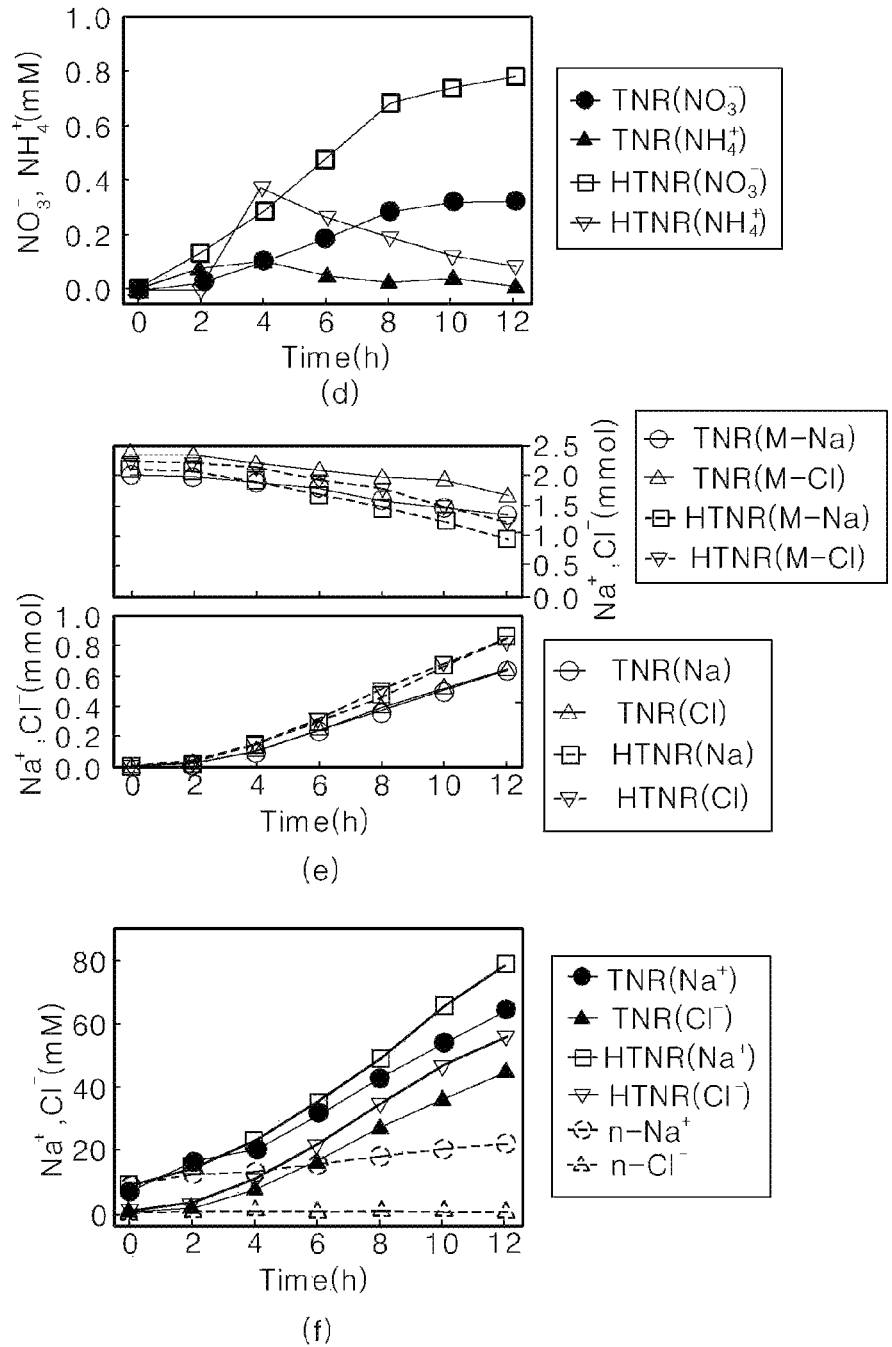

[Fig. 4]
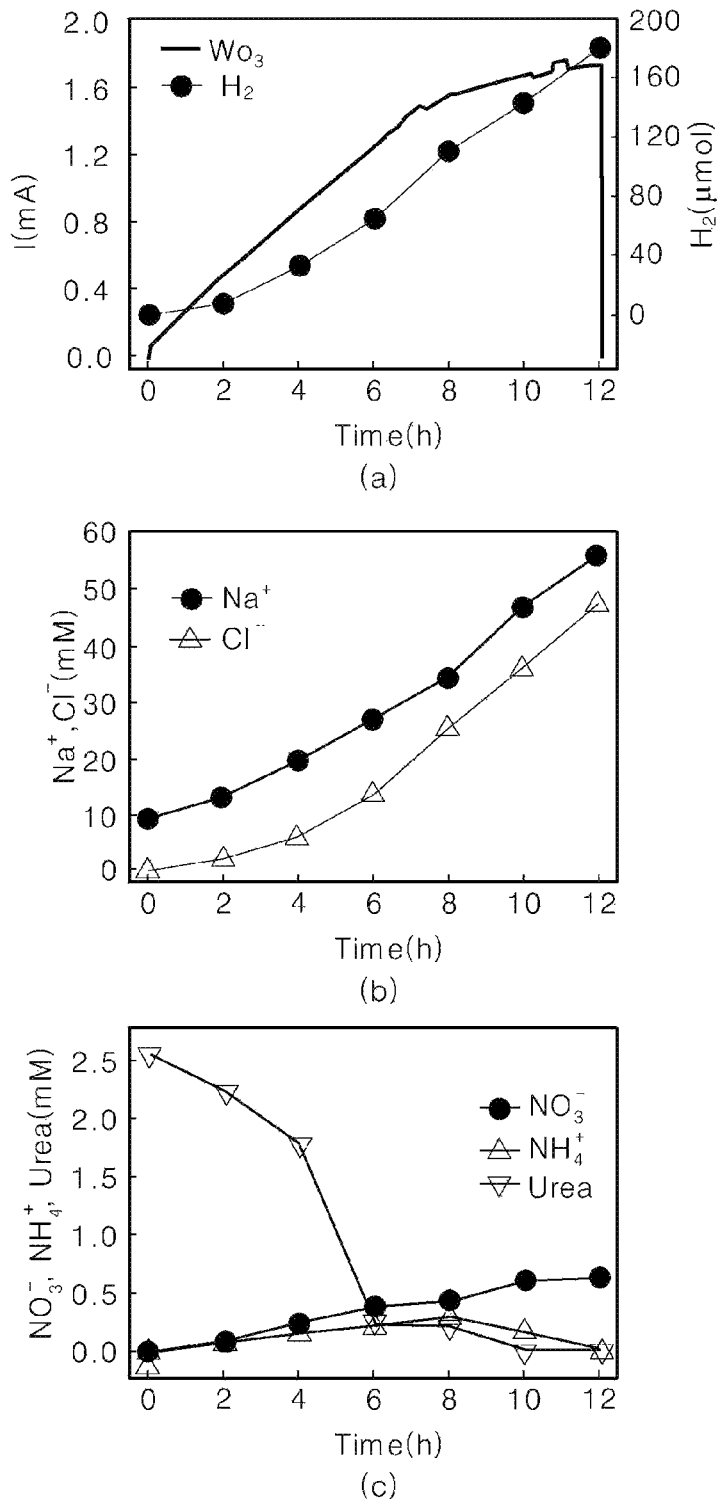

[Fig. 5]
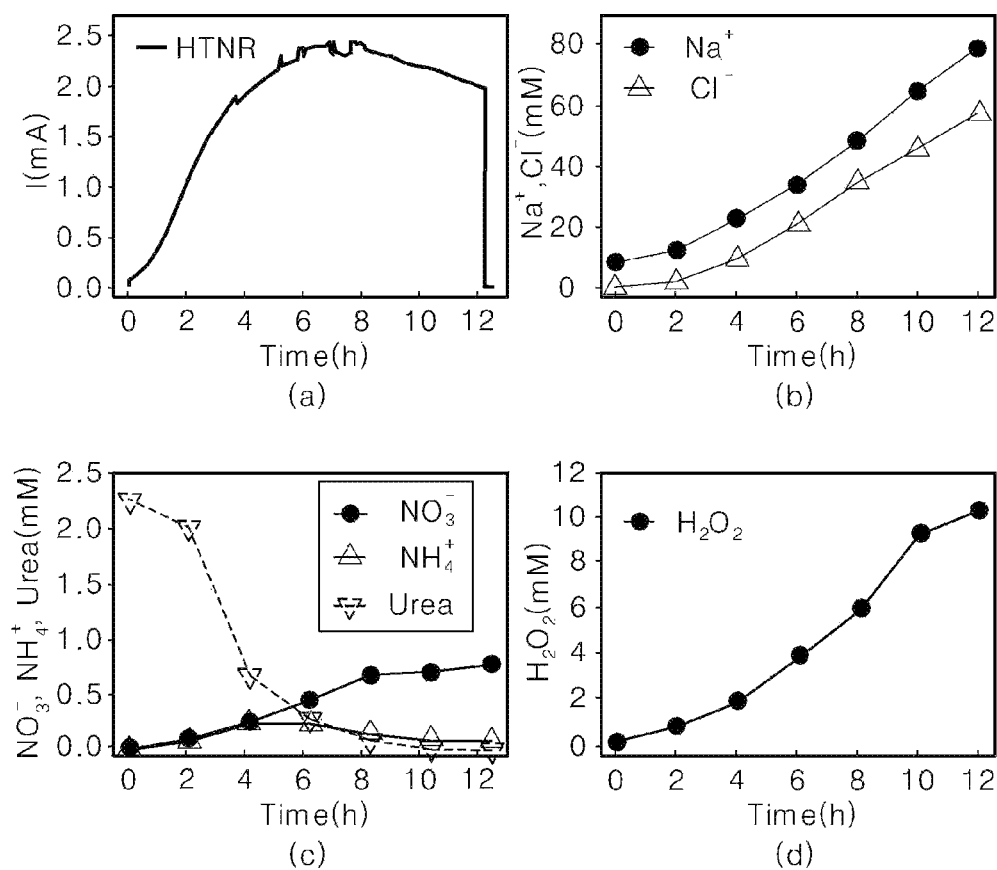

[Fig. 6]
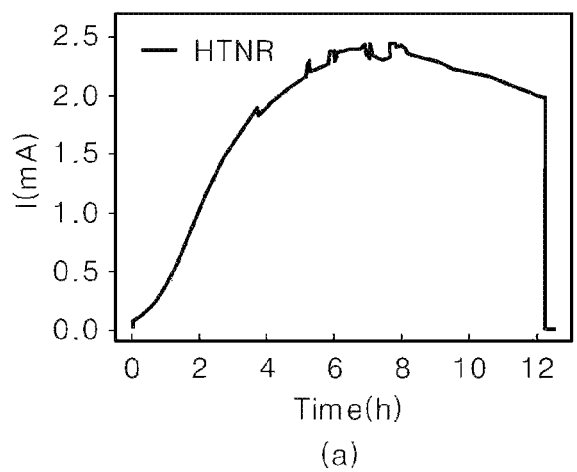
(a)
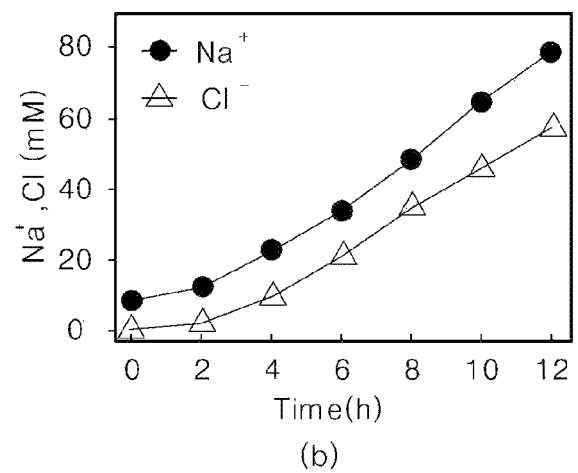
(b)
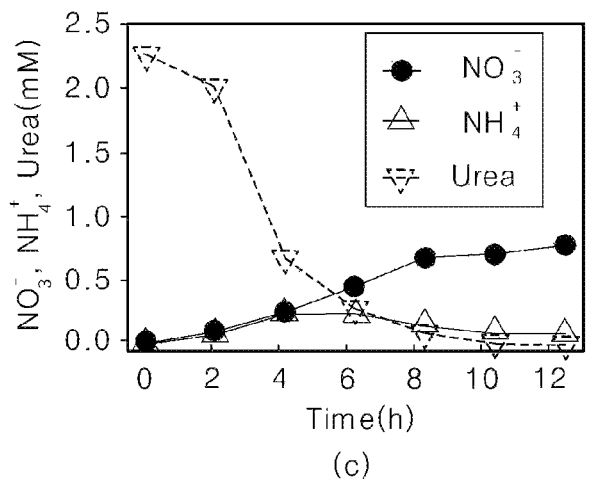
(c)

[Fig. 7]
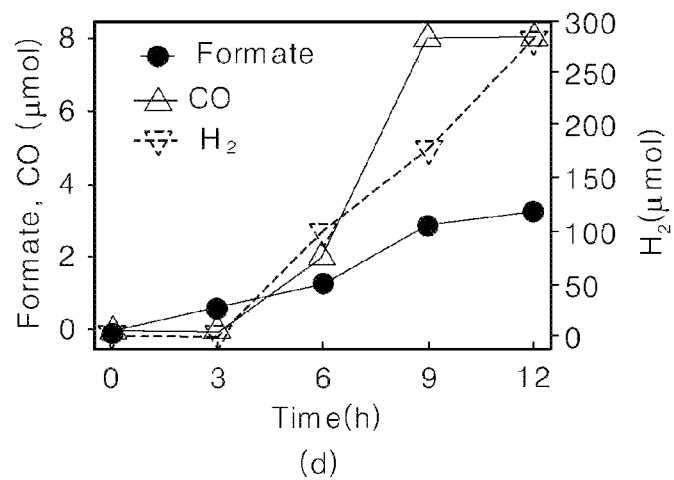
(d)
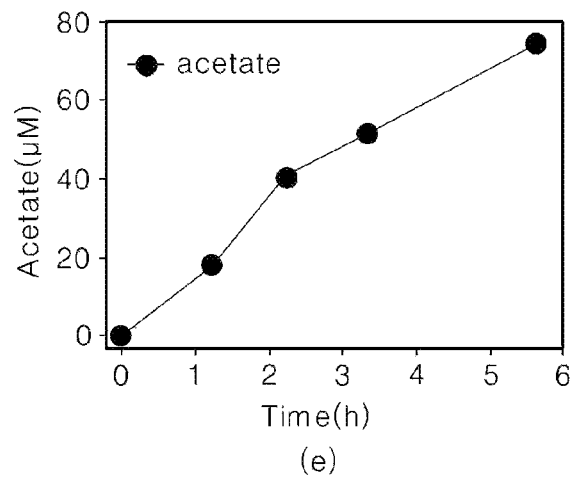
(e)

[Fig. 8]
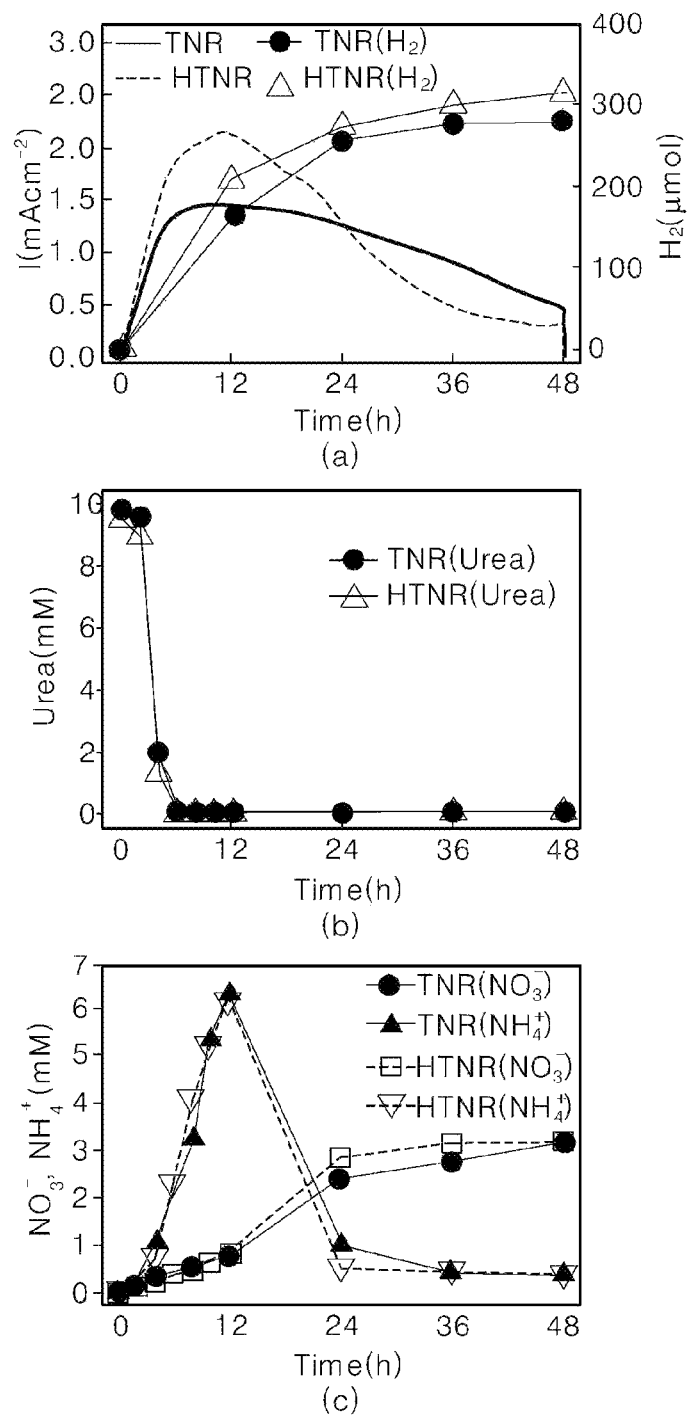

[Fig. 9]
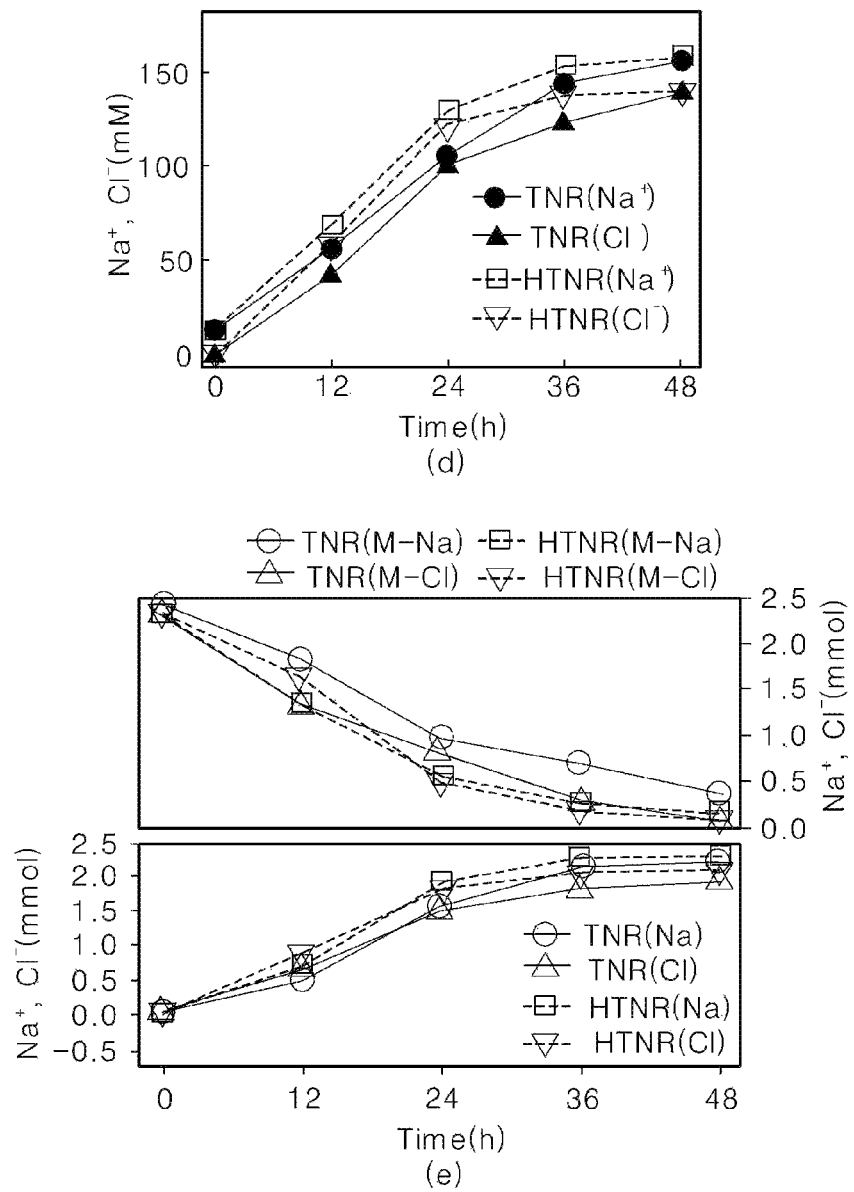

[Fig. 10]
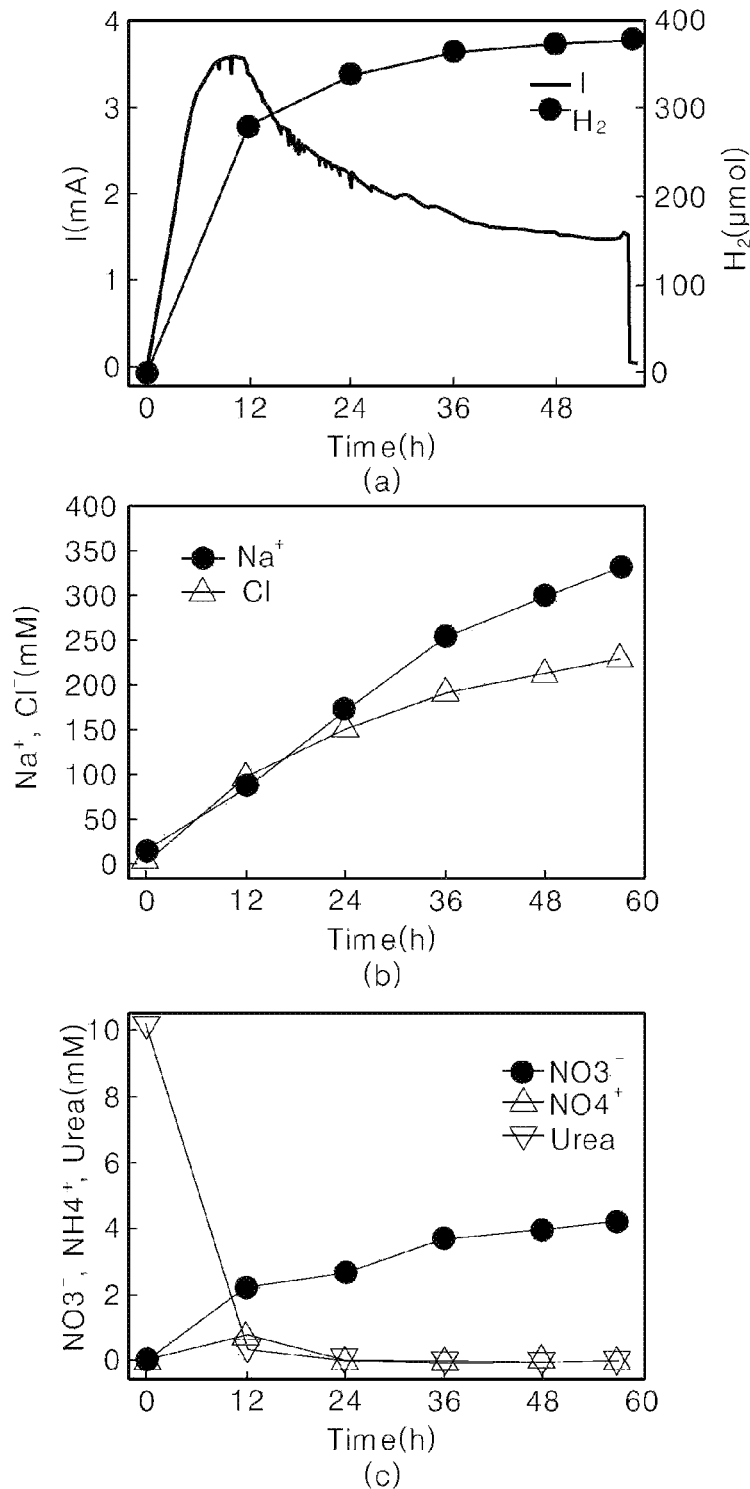

[Fig. 11]
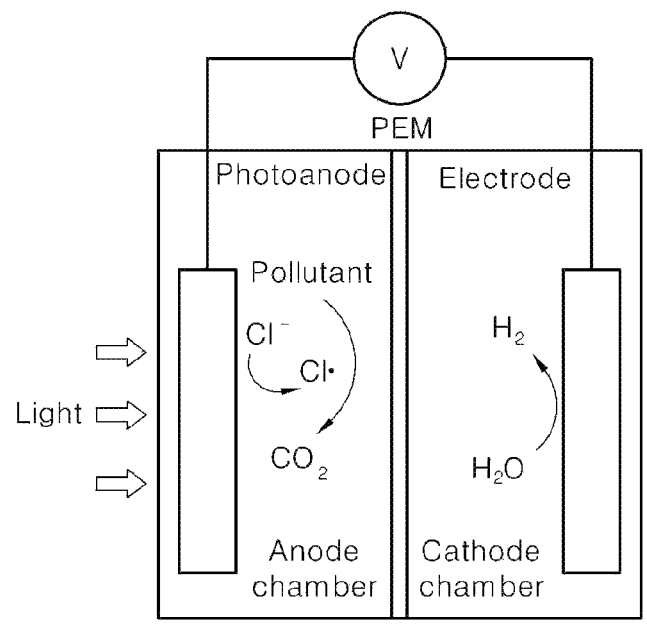

[Fig. 12]
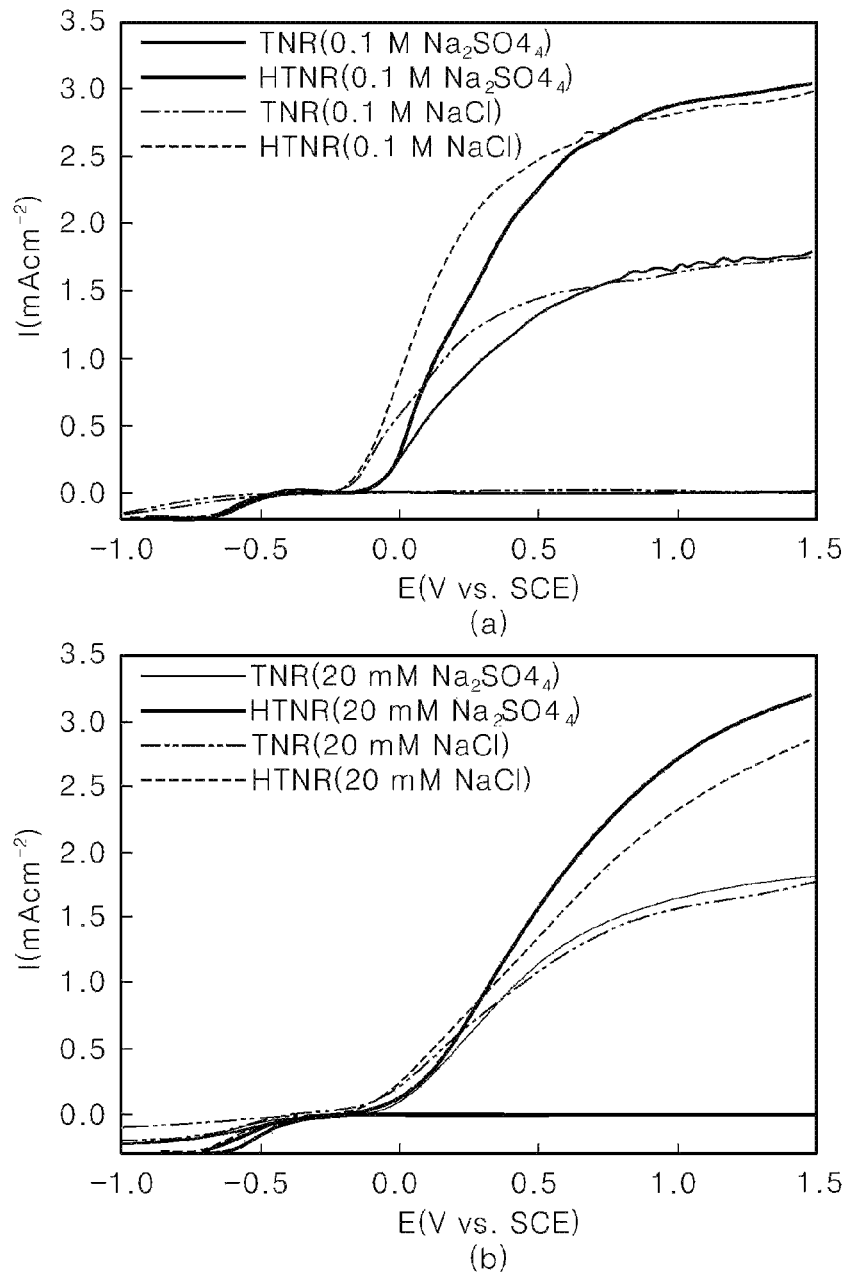

[Fig. 13]
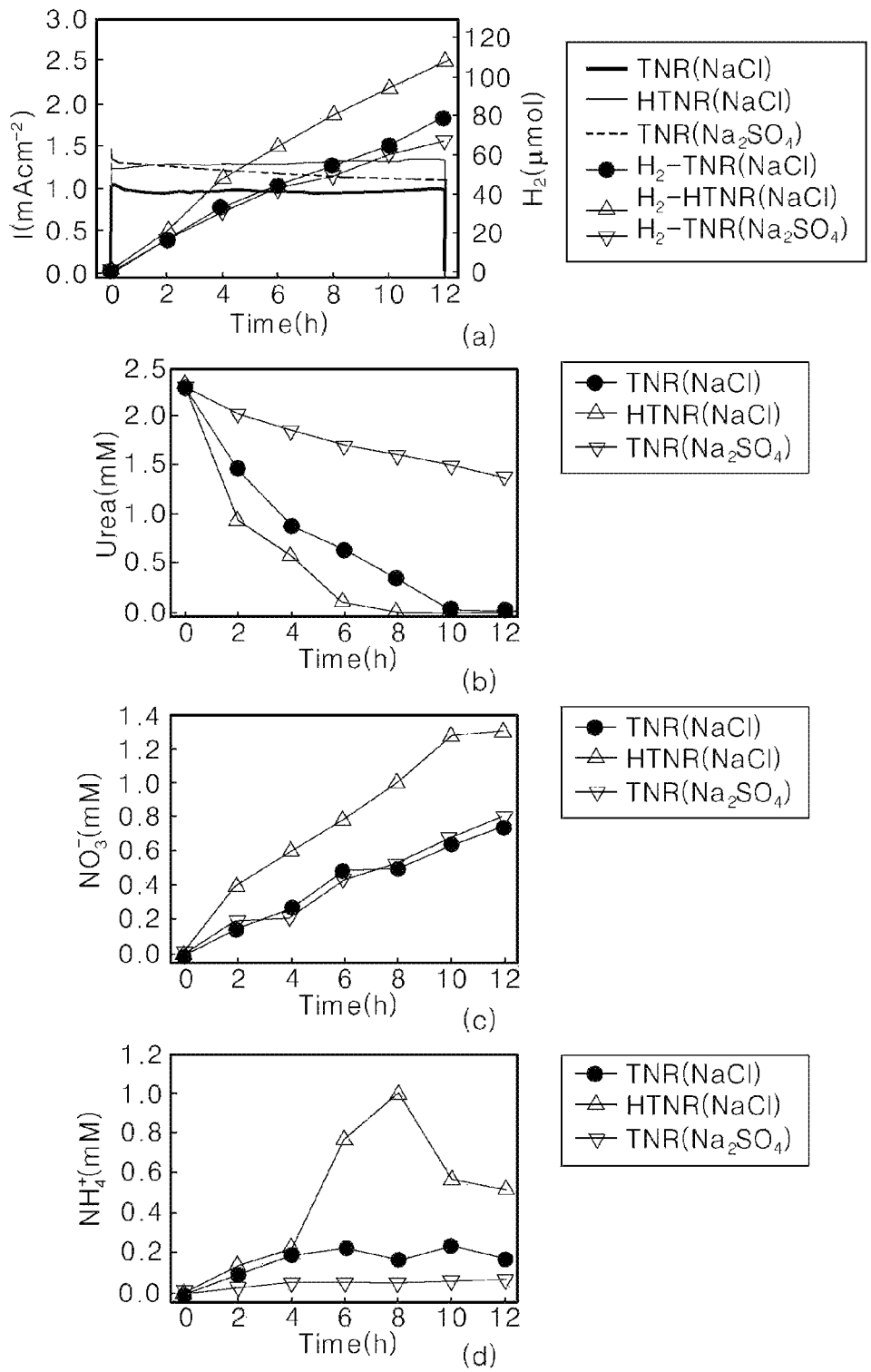

[Fig. 14]
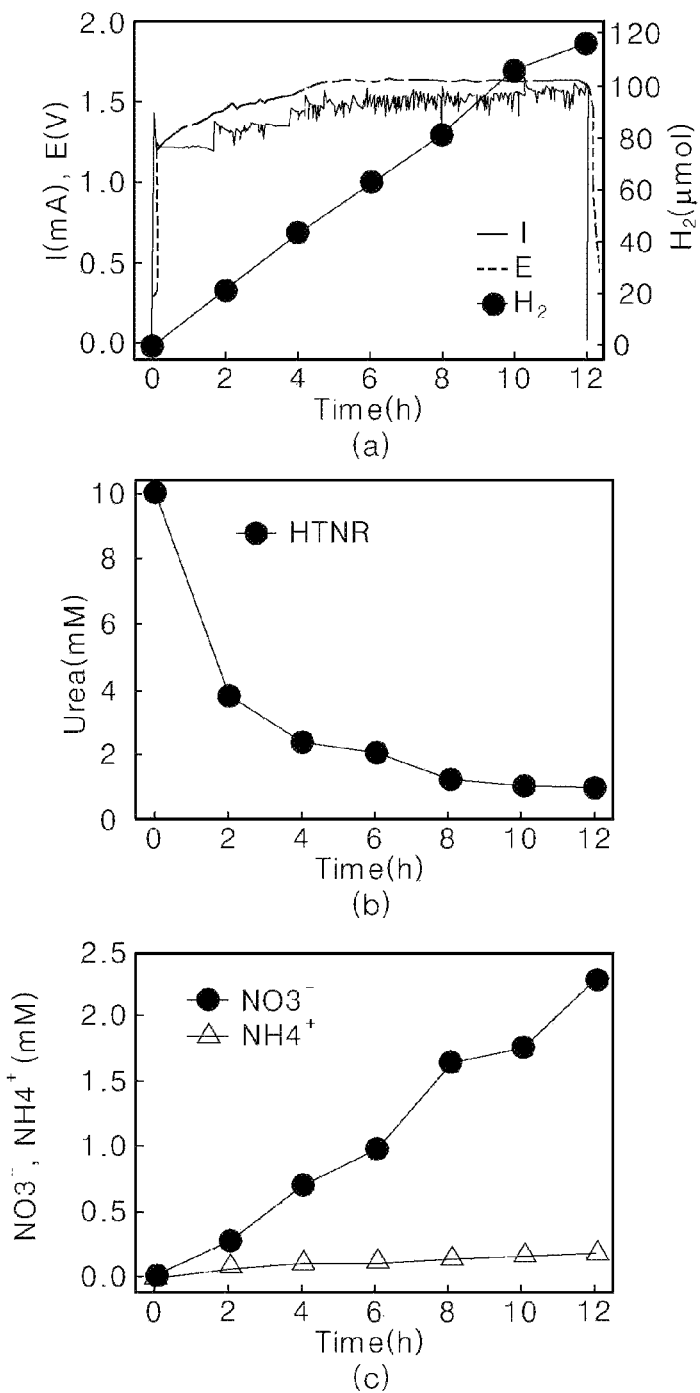

HYBRID SYSTEM FOR WATER TREATMENT, DESALINATION, AND CHEMICAL PRODUCTION

CROSS REFERENCE TO RELATED APPLICATIONS

This application is a U.S. National Stage Application of International Application No. PCT/KR2018/005439, filed on May 11, 2018, which claims the benefit under 35 USC 119(a) and 365(b) of Korean Patent Application No. 10-2017-0060432, filed on May 16, 2017, in the Korean Intellectual Property Office, the entire disclosure of which is incorporated herein by reference for all purposes.

TECHNICAL FIELD

The present invention relates to a hybrid system for water treatment, desalination, and chemical production, and more specifically to a hybrid system for water treatment, desalination, and chemical production that photoelectrochemically desalinates saltwater or seawater to produce freshwater, uses chloride ions generated during the desalination to purify wastewater, and uses electrons generated at a photoanode during the desalination and wastewater purification to produce hydrogen, hydrogen peroxide or at least one carbon compound.

BACKGROUND ART

Seawater accounts for approximately 97% of water on the earth and the remainder is freshwater. Only a limited amount of global freshwater is available to humans. Further, recent environmental changes have caused serious water shortage problems.

River water filtration, groundwater exploitation and artificial rainfall are considered as solutions to water shortage problems. However, desalination of seawater as an inexhaustible resource is emerging as the most realistic method for fundamentally eliminating water shortage.

The desalination of seawater or saltwater (herein referred to simply as "seawater desalination") refers to a process for producing freshwater from seawater by the removal of salts. Seawater can be desalinated by thermal desalination, reverse osmosis (RO), and electrodialysis.

For seawater desalination based on reverse osmosis, a semipermeable membrane is interposed between seawater and freshwater compartments and a reverse osmotic pressure higher than the osmotic pressure is applied to the seawater compartment to extract freshwater from the seawater. Reverse osmosis for seawater desalination has the advantages of low energy consumption and easy operation over evaporation for seawater desalination. Due to these advantages, reverse osmosis is widely used at present to desalinate seawater.

For seawater desalination based on electrodialysis, seawater is desalinated to produce freshwater by applying a direct current voltage to an anode and a cathode such that only anions pass through an anion exchange membrane and only anions pass through a cation exchange membrane. Electrodialysis is also applied to wastewater treatment. The use of electrodialysis for seawater desalination can be found in Korean Patent No. 10-1046776.

As described above, reverse osmosis or electrodialysis is used for seawater desalination or wastewater treatment.

Seawater desalination and wastewater treatment by desalting are separately performed in respective systems. Research aimed at integrating a system for seawater desalination and a system for wastewater treatment has not yet been conducted. Furthermore, no research has been conducted on a hybrid system for water treatment, desalination, and chemical production in which desalination and wastewater treatment are performed simultaneously using a photoelectrochemical system and at least one chemical is also produced during the desalination and wastewater treatment.

DETAILED DESCRIPTION OF THE INVENTION

Problems to be Solved by the Invention

Therefore, an object of the present invention is to provide a hybrid system for water treatment, desalination, and chemical production that desalinates saltwater or seawater, purifies wastewater, and produces at least one chemical during the desalination and wastewater purification.

Means for Solving the Problems

According to one aspect of the present invention, there is provided a hybrid system for water treatment, desalination, and chemical production, including a photoanode, an anode chamber, an anion exchange membrane, a middle chamber, a cation exchange membrane, a cathode chamber, and a cathode wherein saltwater or seawater is desalinated by photoelectrochemical electrodialysis in the middle chamber, wastewater is treated by chloride ions generated during the desalination, transferred to the anode chamber, and activated by the photoanode, and at least one chemical species selected from the group consisting of water, oxygen, and carbon dioxide is reduced by electrons supplied from the photoanode in the cathode chamber.

Effects of the Invention

The hybrid system of the present invention can desalinate saltwater or seawater in an easy manner and can oxidize chloride ions generated during the desalination by the photoanode to activate the chloride ions, which can be used to easily decompose and purify wastewater.

In addition, electrons generated during the desalination and wastewater treatment are transferred the cathode to electrochemically reduce water, oxygen or carbon dioxide to produce hydrogen, hydrogen peroxide or at least one carbon compound.

BRIEF DESCRIPTION OF THE DRAWINGS

FIG. 1 is a cross-sectional diagram illustrating a hybrid system for water treatment, desalination, and chemical production according to the present invention.

FIG. 2 shows current generation, cell voltage, desalination, water treatment, and chemical production in a hybrid system using a HTNR photoanode (Example 1-1) and a hybrid system using a TNR photoanode (Example 4-1) photoanode.

FIG. 3 shows current generation, cell voltage, desalination, water treatment, and chemical production in a hybrid system using a HTNR photoanode (Example 1-1) and a hybrid system using a TNR photoanode (Example 4-1) photoanode.

FIG. 4 shows water treatment, desalination, and chemical production in a hybrid system using a $WO_3$ photoanode (Example 5).

FIG. 5 shows water treatment, desalination, and chemical production in a hybrid system using a CP/CNT cathode (Example 2).

FIG. 6 shows water treatment, desalination, and chemical production in a hybrid system using a Cu foam cathode (Example 3).

FIG. 7 shows water treatment, desalination, and chemical production in a hybrid system using a Cu foam cathode (Example 3).

FIG. 8 shows water treatment, desalination, and chemical production in hybrid systems (Examples 1-2 and 4-2) over a long period of time after addition of brackish water.

FIG. 9 shows water treatment, desalination, and chemical production in hybrid systems (Examples 1-2 and 4-2) over a long period of time after addition of brackish water.

FIG. 10 shows water treatment, desalination, and chemical production in a hybrid system (Example 1-3) over a long period of time after only seawater was added.

FIG. 11 is a cross-sectional diagram illustrating a photoelectrochemical system for water treatment according to one embodiment of the present invention.

FIG. 12 shows the photocurrent efficiencies of HTNR and TNR photoanodes used in the system of FIG. 11.

FIG. 13 shows the influences of HTNR and TNR photoanodes on water treatment by chloride ions and the efficiencies of electrolytes in the system of FIG. 11.

FIG. 14 shows the water treatment efficiency of a HTNR photoanode in the system of FIG. 11 as a function of wastewater concentration.

MODE FOR CARRYING OUT THE INVENTION

The present invention will now be described in more detail.

One aspect of the present invention provides a hybrid system for water treatment, desalination, and chemical production, including a photoanode, an anode chamber, an anion exchange membrane, a middle chamber, a cation exchange membrane, a cathode chamber, and a cathode wherein saltwater or seawater is desalinated by photoelectrochemical electrodialysis in the middle chamber, wastewater is treated by chloride ions generated during the desalination, transferred to the anode chamber, and activated by the photoanode, and at least one chemical species selected from the group consisting of water, oxygen, and carbon dioxide is reduced by electrons supplied from the photoanode in the cathode chamber.

FIG. 1 is a cross-sectional diagram illustrating a hybrid system for water treatment, desalination, and chemical production according to the present invention.

Referring to this figure, the hybrid system for water treatment, desalination, and chemical production according to the present invention includes a photoanode, an anode chamber, an anion exchange membrane, a middle chamber, a cation exchange membrane, a cathode chamber, and a cathode.

Specifically, the hybrid system of the present invention is a combination of a photoelectrochemical system for water treatment and an electrodialysis process for desalination and is constructed to include an anode chamber, a cathode chamber, a middle chamber, an anion exchange membrane (AEM) interposed between the middle chamber and the anode chamber, and a cation exchange membrane (CEM) interposed between the middle chamber and the cathode chamber. The three chambers have different functions.

In the system of the present invention, light is irradiated onto the photoanode and a voltage is applied to the photoanode and the cathode such that saltwater or seawater desalination, wastewater treatment, and chemical production reactions take place continuously. Saltwater or seawater desalination, wastewater treatment, and chemical production reactions in the system of the present invention are initiated by irradiating light onto the photoanode.

Saltwater or seawater is desalinated to produce freshwater by photoelectrochemical electrodialysis in the middle chamber.

Specifically, the desalination is performed based on photoelectrochemical electrodialysis by applying a voltage to the photoanode and the cathode and irradiating light onto the photoanode to generate electrons, holes, and an electric current from the photoanode. The electrons, holes, and electric current allow cations and anions in saltwater or seawater to migrate to the cathode and the photoanode, respectively, and as a result, the saltwater or seawater is desalinated by photoelectrochemical electrodialysis.

Chloride ions generated during the desalination in the middle chamber are transferred to the anode chamber where they are used to purify wastewater. A predetermined amount of saltwater or seawater may be provided in advance to the middle chamber or may be continuously supplied to the middle chamber from the outside of the system.

Wastewater can be treated by the photoanode of the anode chamber and the chloride ions transferred from the middle chamber during the desalination.

Specifically, the chloride ions transferred from the middle chamber to the anode chamber during the desalination for freshwater production are oxidized to active chlorine species by reaction with holes generated in the photoanode. Thus, wastewater or organic matter in the anode chamber are easily decomposed and purified by the active chlorine.

A predetermined amount of wastewater or organic matter may be supplied in advance to the anode chamber or continuously supplied to the anode chamber from the outside of the system.

Electrons generated in the photoanode during the desalination and water treatment are transferred to the cathode of the cathode chamber when a voltage is applied and electrochemically reduce at least one chemical species selected from the group consisting of water, oxygen, and carbon dioxide to produce at least one chemical.

Specifically, electrons transferred from the photoanode to the cathode react with nitrogen, argon, oxygen or carbon dioxide supplied for purging to produce hydrogen, hydrogen peroxide or at least one carbon compound. The chemical production is affected by the cathode. Preferably, the carbon compound is acetate, formate, syngas ($CO+H_2$) or carbon monoxide.

The cathode is made of platinum, stainless steel, copper nanowires, copper foam, carbon paper, carbon nanotubes or carbon paper/carbon nanotubes. When a platinum or stainless steel electrode is used as the cathode, hydrogen is produced.

When a carbon paper, carbon nanotube or carbon paper/carbon nanotube electrode is used as the cathode and oxygen is used for purging, hydrogen peroxide is produced.

When a copper nanowire or copper foam electrode is used as the cathode and carbon dioxide is used for purging, acetate, formate or carbon monoxide can be produced.

In the system of the present invention, the photocatalytic photoanode is made of $TiO_2$, hydrogenated $TiO_2$, $WO_3$, $ZnO$, $Nb_2O_5$, $SnO_2$, $ZrO_2$, $SrTiO_3$, $KTaO_3$, $Ni—K_4Nb_6O_{17}$, $CdS$, $ZnS$, $CdSe$, $GaP$, $CdTe$, $MoSe_2$, $WSe_2$, $BiVO_4$ or $Fe_2O_3$.

The photoanode is preferably a $TiO_2$, hydrogenated $TiO_2$ or $WO_3$ electrode.

The present invention will be more specifically explained with reference to the following examples. However, these examples are not intended to limit the scope of the invention.

Examples 1-5

Construction of Hybrid Systems for Water Treatment, Desalination and Chemical Production A hybrid system illustrated in FIG. 1 was constructed in which water treatment, desalination, and chemical production take place continuously.

FIG. 1 is a cross-sectional diagram showing a hybrid system for water treatment, desalination, and chemical production. Referring to this figure, the hybrid system includes an anode chamber, a cathode chamber, a middle chamber, an anion exchange membrane (AEM) interposed between the middle chamber and the anode chamber, and a cation exchange membrane (CEM) interposed between the middle chamber and the cathode chamber. The three chambers have different functions.

In the anode chamber, a hydrogenated $TiO_2$ nanorod (HTNR), $TiO_2$ nanorod (TNR) or $WO_3$ electrode as a photoanode was located in a freshwater or distilled water solution. 2 mM or 10 mM urea was fed into the anode chamber. In the cathode chamber, a platinum (Pt), stainless steel, carbon paper/carbon nanotube (CP/CNT) or Cu foam electrode as a cathode was located in a freshwater or distilled water solution. 2 mM $K_2SO_4$ or 0.1 M $KHCO_3$ as an electrolyte was fed into the cathode chamber.

At least one solution selected from NaCl 5% 860 mM brine, NaCl 3.5% 600 mM seawater collected from Chilpo Beach, Pohang, Gyeongsangbuk-do, Korea), NaCl 0.05-3% 8-500 mM brackish water, and 0.05% NaCl 8 mM freshwater was supplied to the middle chamber.

Hybrid systems of Examples 1-5 were constructed by varying the photoanode, the cathode, the urea concentration or the solution supplied to the middle chamber, as summarized in Table 1.

Multiple reactions of desalination, photoelectrochemical water treatment, and chemical production in each of the hybrid system using a HTNR photoanode (Example 1-1) and the hybrid system using a TNR photoanode (Example 4-1) were analyzed by irradiation of the photoanode of the anode chamber with AM 1.5G light at an intensity of 100 mW/cm² under constant voltage (0.5 V vs. SCE) conditions. The results are shown in FIGS. 2 and 3.

(1) Hydrogen and Energy Production

In FIG. 2, (a) and (b) show time-dependent changes in photocurrent, hydrogen production and cell voltage applied to the photoanode and the cathode in each of the hybrid system of Example 1-1 and the hybrid system of Example 4-1.

Referring to (a) and (b) of FIG. 2, energy and hydrogen were easily produced in the two hybrid systems, and the hybrid system of Example 1-1 generated higher current and voltage and produced a larger amount of hydrogen than the hybrid system of Example 4-1.

(2) Water Treatment by Desalination (c) of FIG. 2 and (d) of FIG. 3 show the amounts of the urea decomposed by chloride ions generated during desalination when the hybrid systems of Examples 1-1 and 4-1 were in operation and the amounts of $NO_3^-$ and $NH_4^+$ as intermediates produced during the urea decomposition, respectively.

(e) of FIG. 3 shows time-dependent changes in the mobility of $Na^+$ and $Cl^-$ from the middle chambers (TNR (M-Na), TNR(M-Cl), HTNR(M-Na), HTNR(M-Cl)) to the anode chambers (TNR(Cl), HTNR(Cl)) and the cathode chambers (TNR(Na), HTNR(Na)) in the hybrid systems.

Referring to (e) of FIG. 3, chloride ions generated during seawater desalination in the middle chambers (TNR(M-Cl), HTNR(M-Cl)) were transferred to the anode chambers (TNR(Cl), HTNR(Cl)) where they were oxidized to active chlorine species by the photoanodes, the active chlorine species decomposed the urea, and $NO_3^-$ and $NH_4^+$ were produced as intermediates during the urea decomposition.

TABLE 1

| | Anode chamber | | | Cathode chamber | | | Middle chamber |
|---|---|---|---|---|---|---|---|
| | Photoanode | Electrolyte | Urea (mM) | Cathode | Solution | Electrolyte | (*) |
| Example 1-1 | HTNR | Freshwater | 2 | Pt | Freshwater | $K_2SO_4$ | Brackish water |
| Example 1-2 | HTNR | Freshwater | 10 | Pt | Freshwater | $K_2SO_4$ | Brackish water |
| Example 1-3 | HTNR | Freshwater | 10 | Pt | Freshwater | $K_2SO_4$ | Seawater |
| Example 2 | HTNR | Freshwater | 2 | CP/CNT | Freshwater | $K_2SO_4$ | Brackish water |
| Example 3 | HTNR | Freshwater | 2 | Cu foam | Freshwater | $KHCO_3$ | Brackish water |
| Example 4-1 | TNR | Freshwater | 2 | Pt | Freshwater | $K_2SO_4$ | Brackish water |
| Example 4-2 | TNR | Freshwater | 10 | Pt | Freshwater | $K_2SO_4$ | Brackish water |
| Example 5 | $WO_3$ | Freshwater | 2 | Pt | Freshwater | $K_2SO_4$ | Brackish water |

(In the middle chamber(*), the brackish water contained 0.17M NaCl and the seawater contained 563.124 mM Na, 637.656 mM Cl)

<Analysis>

1. The Hybrid System Using HTNR Photoanode (Example 1-1) and the Hybrid System Using TNR Photoanode (Example 4-1)

In the hybrid systems of Examples 1-1 and 4-1, the urea was decomposed by the chloride ions transferred to the anode chambers, resulting in slow initial urea decomposition (0-2 h).

(3) Desalination Under Light Irradiation (f) of FIG. 3 shows desalination under light irradiation.

Referring to (f) of FIG. 3, 40.4% and 31.5% of sodium ions ($Na^+$) were transferred from the middle chambers to the cathode chambers and 36.6% and 27.6% of chloride ions ($Cl^-$) were transferred from the middle chambers to the anode chambers when the hybrid systems of Examples 1-1 (HTNR) and 4-1 (TNR) were in operation for 12 h under light irradiation, respectively.

The different mobilities of $Na^+$ and $Cl^-$ from the middle chambers are attributed to pretreatment of the ion exchange membranes (immersion of the ion exchange membranes in 5% NaCl solution for 12 h before use) and the reduced concentration of NaCl in the middle chambers demonstrated that the membrane pretreatment had no influence on desalination.

In contrast, when only an external voltage was applied without light irradiation to operate the hybrid system of Example 1-1, few or substantially no $Na^+$ and $Cl^-$ were transferred (n-$Na^+$, n-$Cl^-$) from the middle chamber to the cathode chamber and the anode chamber, respectively.

From these results, it can be concluded that light irradiation facilitates desalination and leads to an increase in reaction rate.

2. The Hybrid System Using $WO_3$ Electrode Photoanode (Example 5)

Multiple reactions of desalination, photoelectrochemical water treatment, and chemical production in the hybrid system using a $WO_3$ photoanode (Example 5) were analyzed by irradiation of the photoanode of the anode chamber with AM 1.5G light at an intensity of 100 mW/cm$^2$ under constant voltage (0.5 V vs. SCE) conditions.

The results are shown in FIG. 4.

Referring to FIG. 4, chloride ions generated during desalination in the middle chamber were transferred to the anode chamber (FIG. 4b) where they were converted to active chlorine species by the photoanode, the active chlorine species decomposed the urea (FIG. 4c), and a current was generated and hydrogen was produced during the desalination and urea decomposition (FIG. 4a).

3. The Hybrid System Using HTNR Photoanode and CP/CNT Cathode (Example 2)

Multiple reactions of desalination, photoelectrochemical water treatment, and chemical production in the hybrid system using a HTNR photoanode and a CP/CNT cathode (Example 2) were analyzed by irradiation of the photoanode of the anode chamber with AM 1.5G light at an intensity of 100 mW/cm$^2$ and purging the cathode chamber with oxygen ($O_2$) under constant voltage (0.5 V vs. SCE) conditions. The results are shown in FIG. 5.

$Cl^-$ and $Na^+$ generated during desalination in the middle chamber were transferred to the anode chamber and the cathode, respectively ((b) of FIG. 5), urea was easily decomposed by the chloride ions in the anode chamber ((c) of FIG. 5), and energy was produced ((a) of FIG. 5), as in the hybrid systems of Examples 1-1, 4-1, and 5 using HNTR, TNR, and $WO_3$ photoanodes, respectively.

In addition, the hybrid system of Example 2 using a CP/CNT cathode produced hydrogen peroxide in the cathode chamber when purged with oxygen ((d) of FIG. 5).

4. The Hybrid System Using HTNR Photoanode and Cu Foam Cathode (Example 3)

Multiple reactions of desalination, photoelectrochemical water treatment, and chemical production in the hybrid system using a HTNR photoanode and a Cu foam cathode (Example 3) were analyzed by irradiation of the photoanode of the anode chamber with AM 1.5G light at an intensity of 100 mW/cm$^2$ and purging the cathode chamber with carbon dioxide ($CO_2$) under constant voltage (0.5 V vs. SCE) conditions.

The results are shown in FIGS. 6 and 7.

Referring to FIGS. 6 and 7, $Cl^-$ and $Na^+$ generated during desalination in the middle chamber were transferred to the anode chamber and the cathode, respectively ((b) of FIG. 6), urea was easily decomposed by the chloride ions in the anode chamber ((c) of FIG. 6), and energy was produced ((a) of FIG. 6), as in the hybrid systems of Examples 1-1, 4-1, and 5 using HNTR, TNR, and $WO_3$ photoanodes, respectively.

In addition, the hybrid system of Example 3 using a Cu foam cathode produced formate, acetate, and syngas (CO+ $H_2$) in the electrolyte of the cathode chamber ((d) and (e) of FIG. 7) when purged with carbon dioxide.

5. Long-Term Efficiencies of the Hybrid Systems (Examples 1-2 and 4-2) when Brackish Water was Used The long-term efficiencies of the hybrid systems were analyzed. To this end, multiple reactions of desalination, photoelectrochemical water treatment, and chemical production in each of the hybrid systems of Examples 1-2 and 4-2 fed with 10 mM urea were analyzed by irradiation of the photoanode of the anode chamber with AM 1.5G light at an intensity of 100 mW/cm$^2$ under constant voltage (0.5 V vs. SCE) conditions during 48-h operation of the hybrid system.

The results are shown in FIGS. 8 and 9.

Referring to FIGS. 8 and 9, $Cl^-$ and $Na^+$ generated during desalination in the middle chambers (the top graph of (e) of FIG. 9) were transferred to the anode chamber and the cathode, respectively (the bottom graph of (e) of FIG. 9 and (d) of FIG. 9), urea was easily decomposed by the chloride ions in the anode chamber ((b) and (c) of FIG. 8), energy was produced ((a) of FIG. 8), and hydrogen was produced in the cathode ((a) of FIG. 8) during 48-h operation of the systems.

6. Long-Term Efficiency of the Hybrid System (Example 1-3) when Only Seawater was Used Multiple reactions of seawater desalination, photoelectrochemical water treatment, and chemical production in the hybrid system of Example 1-3 when only seawater was used, and the long-term efficiency of the hybrid system were analyzed. To this end, multiple reactions of desalination, photoelectrochemical water treatment, and chemical production in the hybrid system of Example 1-3 were analyzed by irradiation of the photoanode of the anode chamber with AM 1.5G light at an intensity of 100 mW/cm$^2$ under constant voltage (0.5 V vs. SCE) conditions during 48-h operation of the hybrid system.

The results are shown in FIG. 10.

Referring to FIG. 10, the hybrid system of Example 1-3 enabled desalination, water treatment by urea decomposition, and energy and hydrogen production, like when brackish water was used in Example 1-2 (FIG. 6). In addition, the concentration of chloride ions generated during seawater desalination was high, resulting in an increased amount of current.

7. Analysis of Efficiencies of the HTNR and TNR Photoanodes

To further scrutinize the desalination, photoelectrochemical water treatment, and chemical production efficiencies of the HTNR and TNR photoanodes used in the hybrid systems, a photoelectrochemical system for water treatment illustrated in FIG. 11 was constructed. The photoelectrochemical system was constructed to include a photoanode, an anode chamber, a cathode chamber, and a cathode. A HTNR or TNR electrode was used as the photoanode, freshwater was used as a solution of the two chambers, a Pt electrode was used as the cathode, and $K_2SO_4$ was used as an electrolyte of the cathode chamber. The performance of the photoelectrochemical system using the HTNR photoanode was compared with that of the photoelectrochemical system using the TNR photoanode.

(1) Photocurrent

FIG. 12 shows the photocurrent efficiencies of the HTNR and TNR electrodes of the photoelectrochemical systems. In each of the photoelectrochemical systems, $Na_2SO_4$ or NaCl was used as the electrolyte of the anode chamber and the photoanode of the anode chamber was irradiated with AM 1.5G light at an intensity of 100 mW/cm².

Referring to FIG. 12, higher photocurrent values were obtained for both $Na_2SO_4$ and NaCl electrolytes when the HTNR photoanode was used than when the TNR photoanode was used. Particularly, more negative onset potentials were obtained when NaCl was used as the electrolyte, indicating the oxidation of Cl⁻.

(2) Water Treatment

FIG. 13 shows the effects of the HTNR and TNR photoanodes on water treatment in the photoelectrochemical water treatment systems when 2 mM urea was added to the anode chambers. When 20 mM NaCl and 20 mM $Na_2SO_4$ were used as the electrolytes of the anode chambers, the influence of chloride ions (Cl⁻) on water treatment was analyzed. At this time, AM 1.5G light with an intensity of 100 mW/cm² was irradiated onto the photoanodes of the anode chambers under constant voltage (0.5 V vs. SCE) conditions.

(a) of FIG. 13 shows the photocurrent values of the photoelectrodes and the amounts of hydrogen produced in the cathode chamber. The use of the HTNR photoanode was revealed to lead to an improvement in efficiency.

Referring to (b) to (d) of FIG. 13, when NaCl was used as the electrolyte, urea was easily decomposed by chloride ions (Cl⁻), with the result that the concentrations of $NO_3^-$ and $NH_4^+$ as intermediates varied with time. Urea was more easily decomposed when the HTNR electrode was used than when the TNR electrode was used.

(3) Wastewater Concentration

As can be seen from FIGS. 12 and 13, a higher photoelectric efficiency was obtained when the HTNR electrode was used than when the TNR electrode was used. Thus, the efficiency of the HTNR photoanode in the treatment of high-concentration wastewater was analyzed. To this end, 10 mM urea was fed into the anode chamber of the photoelectrochemical system of FIG. 11, which had been supplied with 20 mM NaCl, and the degree of decomposition of urea was analyzed over 12 h. At this time, AM 1.5G light at an intensity of 100 mW/cm² was irradiated onto the photoanode of the anode chamber under constant voltage (0.5 V vs. SCE) conditions.

The results are shown in FIG. 14.

Referring to FIG. 14, the use of the HTNR photoanode led to the production of energy and hydrogen and the supply of NaCl led to rapid decomposition of urea within 0-2 h.

Although the present invention has been described herein with reference to the limited embodiments, it is not limited to the embodiments. It will be evident to those skilled in the art that many variations and modifications are possible within the spirit and scope of the invention and the range of equivalency of the appended claims.

The invention claimed is:

1. A hybrid system for water treatment, desalination, and reduction of at least one chemical species, comprising a photoanode, an anode chamber comprising urea, an anion exchange membrane, a middle chamber, a cation exchange membrane, a cathode chamber comprising $K_2SO_4$ or $KHCO_3$, and a cathode, wherein saltwater or seawater is desalinated by photoelectrochemical electrodialysis in the middle chamber, wastewater is treated by chlorine species generated at the photoanode from chloride ions transferred to the anode chamber during the desalination, and activated by the photoanode, and the at least one chemical species is selected from the group consisting of water, oxygen, and carbon dioxide and reduced by electrons supplied from the photoanode to the cathode in the cathode chamber, wherein the anode chamber and the middle chamber are separated by the anion exchange membrane, and the middle chamber and the cathode chamber are separated by the cation exchange membrane, and wherein the photoanode consists of $TiO_2$, $WO_3$, ZnO, $Nb_2O_5$, $SnO_2$, $ZrO_2$, $SrTiO_3$, $KTaO_3$, Ni—$K_4Nb_6O_{17}$, CdS, ZnS, CdSe, GaP, CdTe, $MoSe_2$, $WSe_2$, $BiVO_4$ or $Fe_2O_3$.

2. The hybrid system according to claim 1, wherein a voltage is applied to the photoanode and the cathode and light is irradiated onto the photoanode such that the water treatment, the desalination, and the chemical production take place.

3. The hybrid system according to claim 1, wherein the water, the oxygen or the carbon dioxide is reduced to produce hydrogen, hydrogen peroxide or at least one carbon compound, respectively, in the cathode chamber.

4. The hybrid system according to claim 3, wherein the carbon compound is acetate, formate, or carbon monoxide.

5. The hybrid system according to claim 1, wherein the cathode comprises platinum, stainless steel, copper nanowires, copper foam, carbon paper, carbon nanotubes, or a composite of carbon paper and carbon nanotubes.

6. The hybrid system according to claim 1, wherein the photoanode consists of $Nb_2O_5$, $ZrO_2$, $SrTiO_3$, $KTaO_3$, Ni—$K_4Nb_6O_{17}$, $MoSe_2$, or $WSe_2$.

* * * * *